United States Patent

Maldonado

[15] 3,695,747

[45] Oct. 3, 1972

[54] OPTICAL TRANSMISSION SYSTEM INCLUDING STRAIN-BIASED ELECTROOPTIC CERAMIC DEVICES

[72] Inventor: Juan Ramon Maldonado, Berkeley Heights, N.J.

[73] Assignee: Bell Telephone Laboratories, Incorporated, Murray Hill, Berkely Heights, N.J.

[22] Filed: June 4, 1971

[21] Appl. No.: 149,996

[52] U.S. Cl. ................350/150, 340/173.2, 350/149, 350/157

[51] Int. Cl. ................G02f 1/24

[58] Field of Search..............350/149, 150, 157, 160; 340/173.2, 173 LS

[56] References Cited

UNITED STATES PATENTS 3,531,182 9/1970 Land et al..................350/150

*Primary Examiner*—David Schonberg
*Assistant Examiner*—Paul R. Miller
*Attorney*—R. J. Guenther and Arthur J. Torsiglieri

[57] ABSTRACT

A polycrystalline electrooptic plate, such as a fine grain ferroelectric ceramic plane parallel plate, is subjected to a constant (in time) and uniform (in space) tensile stress along an axis of tension in the plane of the plate. A pair of electrode layers on a major surface of the plate define a gap in the plate, the gap running along a direction at an oblique angle with respect to the axis of tension. Control voltage pulses are applied across these electrodes to produce electric fields in the plane of the plate across the gap, thereby producing a controllable birefringence in the plate with respect to optical radiation propagating normal to the plate in the gap. By locating this place between an optical polarizer and analyzer, an optical switch ("light gate") can be formed with simple electrical access to the electrode layers.

13 Claims, 4 Drawing Figures

INVENTOR
BY J. R. MALDONADO

D Caplan

ATTORNEY

OPTICAL TRANSMISSION SYSTEM INCLUDING STRAIN-BIASED ELECTROOPTIC CERAMIC DEVICES

Field of the Invention

This invention relates to the field of the field of optical transmission systems, in particular, to those involving ferroelectric devices.

BACKGROUND OF THE INVENTION

In U.S. Pat. No. 3,512,864, issued to G. H. Haertling on May 19, 1970, optical retardation devices utilizing ferroelectric ceramic plates were disclosed in conjunction with crossed polarizers and analyzers for use as light gates. Each of such devices requires at least two pair of access wire leads, in which each pair of access wire leads is connected to a different pair of electrodes. These electrode pairs define different directions for the electric field produced in the plane of the plate, in order to produce different phase retardations with respect to the different transverse polarizations of the optical beam propagating through the plate. Therefore, such devices require rather complicated access wiring, especially when a single ferroelectric plate is incorporated in a matrix array with random electrical access.

SUMMARY OF THE INVENTION

In accordance with this invention, a fine grain electrooptic plate, such as a ferroelectric plate of lanthanum doped lead zirconate-lead titanate, is subjected to a tensile stress which produces a constant and uniform tensile (or compressive) strain ("strain bias") in the plane of the plate. Thereby, an axis of stress is defined in the plane of the plate, producing a strain bias and hence on optical birefringence therein. A pair of electrodes disposed on one major surface define a thin parallel gap in the plate, running along a direction which advantageously is oriented at an acute angle $\theta$ with respect to the tension axis. Only a single pair of access wire leads to these electrodes is needed. Variations in control voltages applied to the electrodes produce variations in electric fields in the gap in the plate, these fields oriented at the complement of $\theta$ with respect to the axis of stress. These electric fields produce a controllable birefringent property with respect to optical radiation propagating normally to the plane of the plate in the gap thereof. Thereby, the component of optical radiation which is polarized parallel to the stress axis of the plate suffers a controllably different phase retardation from the retardation of the component of optical radiation polarized perpendicular to the stress axis of the plate. The controllable relative phase retardation is enhanced by reason of the strain bias of the plate. As known in the art, such a controllable difference in the retardation of the polarization components can be converted into a controllable optical intensity modulation, by using a crossed polarizer and analyzer, located before and behind the plate, respectively. Thereby, a light gate ("optical switch") with respect to suitably polarized incident optical radiation is formed. In addition, in order to enhance the wavelength independence of the ON-OFF ratio, that is, the ratio of the intensity of transmitted light when the optical switch is ON to the intensity of transmitted light when the optical switch is OFF, a pair of such strain-biased ferroelectric ceramic plates as described above are located in tandem with their stress axes oriented advantageously at right angles to each other; while control voltage pulses are applied to only one of these plates. Thereby, for all wavelengths of light traversing these plates, the relative phase retardation of polarization components of the various optical wavelengths propagating through the plates can all be made substantially equal to zero in the OFF condition, thereby producing an OFF condition characterized by substantially complete absence of any optical radiation transmitted by the system comprising these plates located between crossed polarizer and analyzer.

In a specific embodiment of this invention, a fine grain ferroelectric ceramic device is built as follows. A fine grain ferroelectric ceramic plane-parallel plate, typically lanthanum doped lead zirconate-lead titanate, provided with a pair of electrodes on at least one of the major parallel surfaces, is bonded by a transparent epoxy cement to a transparent elastic member, such as a Plexiglas slab. The elastic member is also provided with a pair of electrodes, each of which is electrically connected to a different one of the electrodes on the surfaces of the ferroelectric ceramic plate. The elastic member is then subjected to a bending moment in such a direction as to produce a constant strain in the ferroelectric plate bonded thereto, the direction of bending being in such a direction as to stress the plate along an axis at an acute angle with respect to the gap between the electrodes on the ferroelectric ceramic plate. The elastic member (together with the plate bonded thereto) is located between a polarizer and analyzer which are mutually "crossed" (optical axes mutually perpendicular). Electrical pulses are supplies to the pair of electrodes located on the elastic member, which thereby produce electric fields in the plate in the gap region between the electrodes located on the ferroelectric ceramic plate. The intensity of light transmitted by the system of polarizer, ferroelectric plate, and analyzer is controllable by the sequence of various electrical control pulses applied to the electrodes.

This invention, together with its features, objects, and advantages, may be better understood from a reading from the following detailed description in conjunction with the drawing in which.

For the sake of clarity only, none of the drawings is to scale.

DETAILED DESCRIPTION

Figure 2:
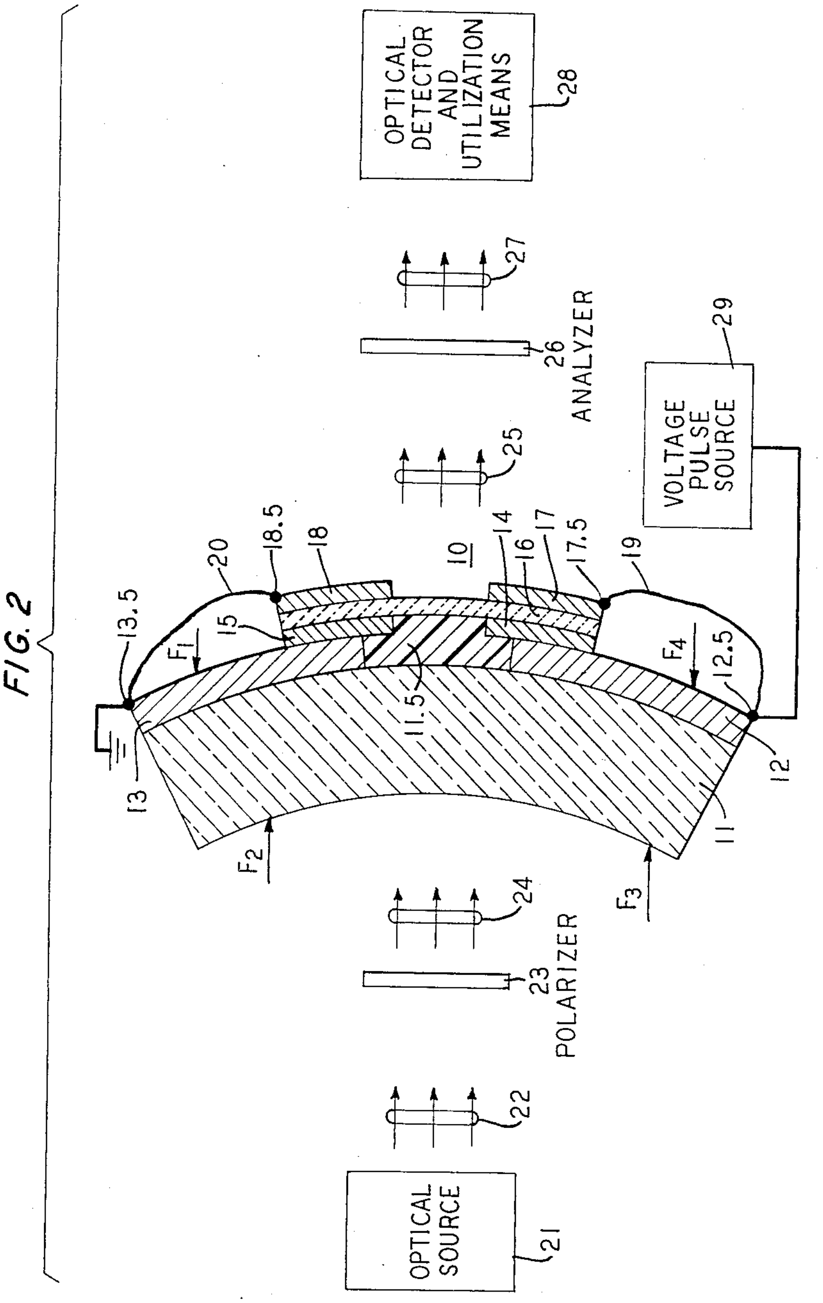
FIG. 2 is a schematic view partly in cross section of an optical light gate system including the ferroelectric ceramic device shown in FIG. 1.
Figure 1:
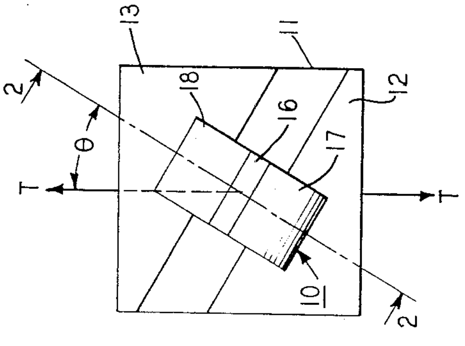
FIG. 1 is a top plan view of a strain-biased ferroelectric ceramic optical retardation device, according to an embodiment of the invention.

A strain-biased ferroelectric light gate device 10 (FIGS. 1 and 2) includes a fine grain ferroelectric ceramic parallel plate 16. The plate 16 typically is composed of six atomic percent lanthanum doped lead zirconate-lead titanate (35 percent/65 percent by weight). The size of the grains in this plate 16 advantageously is approximately 2 microns or less, as manufactured by a hot pressing technique, and furnished by Clevite Corp. for example. Upon each of its opposed major surfaces is located a pair of metal electrodes 14 and 15, 17 and 18 (FIG. 2). These metal layers are electrically conducting layers, typically of gold which advantageously has been vapor deposited onto the opposed surfaces of the ceramic plate 16. The plate 16, together with its electrodes 14, 15, 17, and 18 are bonded by a transparent layer of epoxy cement 11.5 to a transparent elastic member 11, typically Plexiglas. Upon the elastic member 11 are disposed electrode layers 12 and 13 which contact the electrodes 14 and 15, respectively. The electrode layers 12 and 13 typically are layers of gold, which advantageously have been vapor deposited on layers of chromium typically about 100 A thick for adherence to the elastic member 11. The elastic member 11 is subjected to a bending moment by forces $F_1$ through $F_4$ (FIG. 2), provided for example by a set of frame holders (not shown). Thereby, the ferroelectric ceramic plate 16 is subjected to a constant and uniform tension along the axis T—T (FIG. 2). Typically, the strain resulting from this tension is of the order of $10^{-3}$. The central gap in the plate 16 substantially between the electrodes 14 and 15 defines an orientation in space; and the normal to this gap, the center line 2—2 (FIG. 1), makes an acute angle $\theta$ with respect to the axis of tension, T—T. For optimum performance, the angle $\theta$ is approximately 45°. That is, at this angle $\theta$, relative optical retardation is a maximum and the power required to operate the device <u>10</u> is a minimum. However, angles ¼ in the range of about 10° to 80° are also acceptable in the practice of the invention.

Terminals 17.5 and 18.5, located on electrodes 17 and 18, are connected respectively by wire leads 19 and 20 to terminals 12.5 and 13.5, located on electrodes 12 and 13 respectively. A voltage pulse source 29 provides voltage pulses, advantageously at least a millisecond in pulse width, to the terminals 12.5 and 13.5.

A source 21 (FIG. 2) of a beam of light 22 provides an incident beam of light 24 upon the light gate <u>10</u>, after traversing the polarizer 23. The axis of the polarizer 23 is advantageously oriented such that the beam of light 24 is polarized at an angle of 45° with respect to the tension axis T—T (FIG. 1) of the strain-biased ceramic plate 16. After traversing the ceramic plate 16, the resulting beam 25 is incident upon an analyzer 26, the axis of which is crossed with respect to the axis of the polarizer 23. After traversing the analyzer 26, the exit beam 27 is formed, which is incident upon the optical detector and utilization means 28. The intensity of beam 27 is a function of the state of polarization due to relative optical retardation in the plate 16, which in turn depends upon the amplitude of the immediately preceding voltage pulse applied across the terminals 12.5 and 13.5 by the voltage pulse source 29.

In a typical example, the ferroelectric ceramic plate 16 is 60 microns thick, and the gap between the electrodes 17 and 18 (as well as between electrodes 14 and 15) is approximately 100 microns wide. In order to have the system (FIG. 2) in the ON condition (maximum intensity for exit beam 27), a pulse of approximately 150 volts is applied from the voltage source 29; and in order to have this system in the OFF state, a voltage pulse of opposite polarity and approximately 75 volts in height is applied across the terminals 12.5 and 13.5. Multilevel switching is also obtainable by means of intermediate voltage pulses, and the ON and OFF conditions can be interchanged by orienting the axis of the analyzer 26 parallel (rather than perpendicular) to the axis of polarizer 23.

Figure 3:
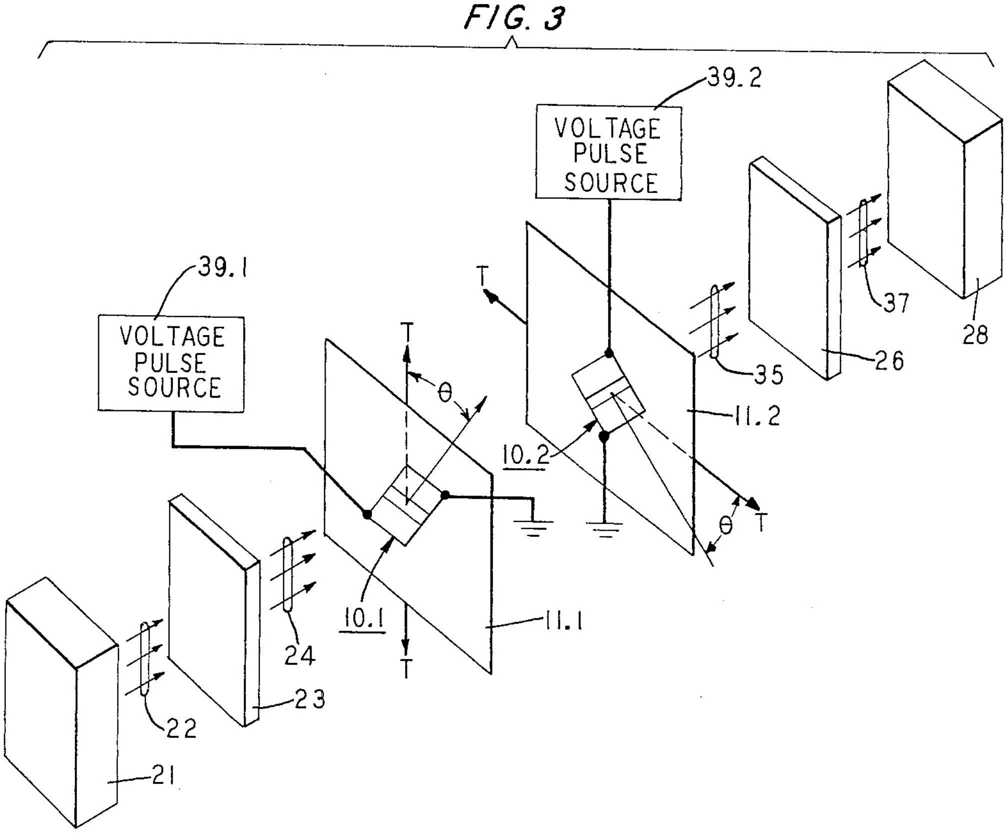
FIG. 3 is a schematic view of an optical light gate system, including a pair of strain-biased ferroelectric optical retardation devices in accordance with still another embodiment of the invention.

FIG. 3 shows an optical system including a pair of strain-biased light gate devices 10.1 and 10.2, according to an alternate embodiment of this invention. The pair of strain-biased ceramic light gate devices, <u>10.1</u> and <u>10.2</u>, are oriented with their tension axis T-T advantageously at an angle of substantially 90° with respect to each other, by virtue of being bonded to elastic members 11.1 and 11.2, respectively, bent at right angles with respect to each other. Each of the devices <u>10.1</u> and <u>10.2</u> is structurally equivalent (prior to strain biasing) to the previously described device <u>10</u> (FIGS. 1 and 2); and each of the elastic members (11.1 and 11.2) is equivalent to the previously described member 11 (except for respective orientations of bending). Initially, in order to turn the system shown in FIG. 3 into the OFF condition, the voltage pulse sources 39.1 and 39.2 apply voltage pulses to the devices <u>10.1</u> and <u>10.2</u> of approximately 75 volts each. Thereafter, except to compensate for aging effects (if any), no further voltage pulses need be applied to the device <u>10.2</u>; whereas control voltage pulses are thereafter applied only by the voltage source 39.1 to the device <u>10.1</u>, in order to control the state of polarization of the resulting beam of light 35 and thereby to control the intensity of the exit beam of light 37 after traversing the analyzer 26. In this way, initially, with the system (FIG. 3) in the OFF condition, the two transverse optical polarizations of all wavelengths of light which traverse the devices <u>10.1</u> and <u>10.2</u> suffer equal and opposite phase retardations ("push-pull" arrangement) in these two devices, so that the resulting beam 35 initially contains light (for all wavelengths) of both transverse polarizations with no relative retardation. Thus, after the application of the equal pulses from the voltage pulse sources 39.1 and 39.2 to the devices <u>10.1</u> and <u>10.2</u>, the beam 37 will be "dark" (OFF condition) because of the crossed analyzer 26. However, subsequent to the application of a different voltage pulse from the source 39.1 to the device <u>10.1</u>, different transverse polarizations (i.e., parallel to and perpendicular to the tension axis in the device <u>10.1</u>, for example) will have suffered different retardations upon traversing the devices <u>10.1</u> and <u>10.2</u>; and therefore at this later time the exit beam 37 will be "bright" (ON condition), with an intensity which is a function of the polarity and amplitude of the immediately preceding pulse supplied by the voltage source 39.1 to the device <u>10.1</u>. Again, ON and OFF conditions can be interchanged by orienting the axis of the analyzer 26 parallel (instead of perpendicular) to the axis of the polarizer 23.

Figure 4:
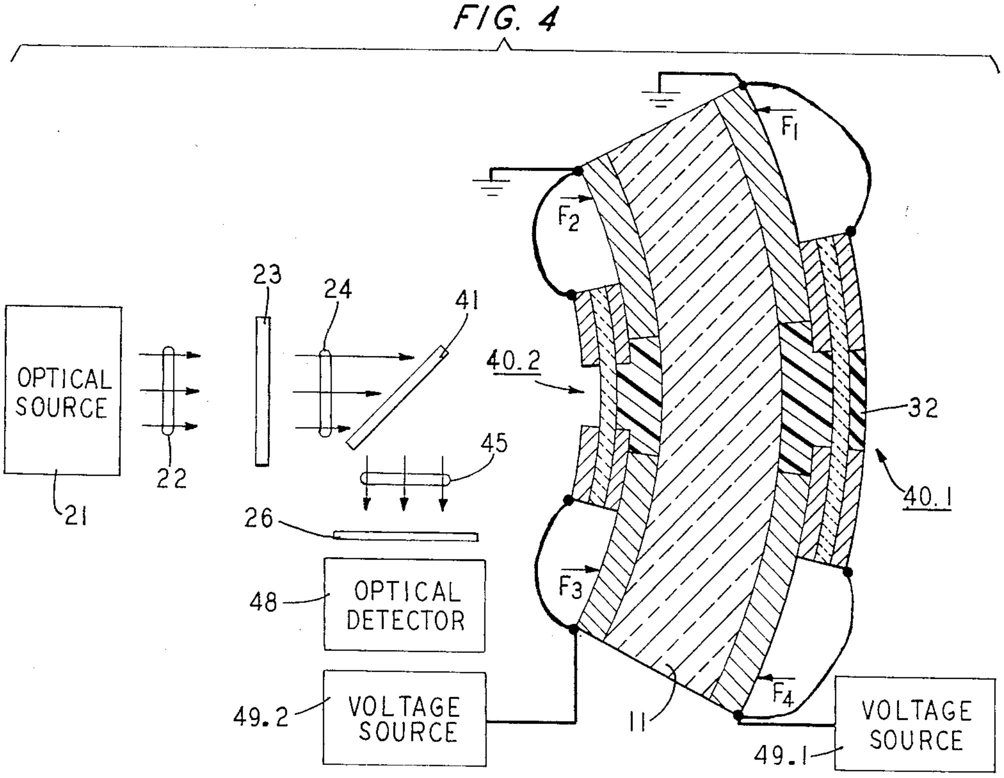
FIG. 4 is a schematic view partly in cross section of an optical system useful for measuring voltages, in accordance with another specific embodiment of the invention.

FIG. 4 shows an optical system useful for remote measurement of voltage pulses supplied by a voltage source 49.1 to one of the devices 40.1. Each of the devices 40.1 and 40.2 is equivalent to the device 10 in structure, prior to strain biasing, and the elastic member 11 is equivalent to that shown and described previously in connection with FIG. 1. The device 40.1, bonded on the opposite surface of the elastic member 11 from the device 40.2, is subjected to a tension in the same direction as the device 40.2 is subjected to a compression due to the bending of the elastic member 11 by forces $F_1$ through $F_4$. This results in a tension in the device 40.1 at right angles to the tension in the device 40.2.

The devices 40.1 and 40.2 (FIG. 4) are initially advantageously subjected to suitable voltage pulses from the sources 49.1 and 49.2, respectively, in order to put these devices into a suitable initial state in which the relative retardation is zero ("push-pull") for the two transverse optical polarizations propagating through these devices. Thereafter, voltage pulses are supplied only to the device 40.1 from the source 49.1.

A beam splitter 41 is located in front of the devices 40.1 and 40.2, and the beam of light 22 from the optical source 21 is incident on this beam splitter. A dielectric reflector 42 is located on the surface of device 40.1, in order to reflect the incoming light from the beam splitter 41 back through the devices 40.2 and 40.1 back to the beam splitter 41, where the exiting light beam 45 is reflected onto the analyzer 26 and to an optical detector and utilization device 48. The intensity of light incident on the detector 48 is a function of the voltage pulse last supplied by the voltage pulse source 49.1 to the device 40.1. Thus, the strain-biased devices 40.1 and 40.2, bonded onto opposed surfaces of the transparent elastic member 11, can serve as a remote voltmeter with a memory.

It is believed that the tension axis in the plate 16 of the device 10 described above creates a preferential direction in the fine grain (polycrystalline) plate 16, similar in optical effect to the optic axis in an electrooptic crystal. However, the operations of the systems described above do not necessarily depend upon the correctness of this theory. In any event, this preferential direction of tension obviates the need for producing control electric fields in the plate 16 in other than the one direction oriented at the angle $\theta$ with respect to the tension axis, T—T. The use of electrode 17, in addition to electrode 14, and the electrode 18, in addition to electrode 15, is merely for the purpose of producing more nearly uniform electric fields in the gap of the plate 16 through which the beam of light propagates. If the plate 16 is sufficiently thin, or if the efficiency of the system can be sacrificed somewhat, then one pair of the electrodes 17 and 18 (or 14 and 15) can be omitted.

While the invention has been described in terms of a particular fine grain ferroelectric ceramic material in the plate 16, various other fine grain ferroelectric materials can be used, as they become available in the art. For example, lead oxide treated or bismuth doped lead zirconate-lead titanate ceramics can also be used for the ferroelectric plate 16 instead of the lanthanum doped ceramic described in detail above. Other rare earth doped lead zirconate-lead titanate fine grain ceramics, as well as other types of materials having similar desired electrooptic birefringent properties can be used as they become available in the art. In such cases where the material used for the plate 16 is not ferroelectric (that is, has no memory properties), then instead of the voltage pulse sources described above, advantageously, continuous voltage sources can be used.

In addition, a matrix array of many such strain-biased plates 16 can be bonded to a surface of a single transparent elastic member subjected to a bending moment, and individual voltage pulses provided for each such plate.

The separated polarizers and analyzers described above can be incorporated as polarizing layers in the device 10, rather than being separated in space therefrom.

Although the axis of tension has been described (ideally) as in the plane of plate 16, it is sufficient that the axis of tension (or compression) have a significant component in the plane of this plate, and that the electric field have a significant component in the plane of the plate at an oblique angle to the component of the axis of tension in the plane of the plate.

Instead of bending the elastic member 11 (or 11.1 and 11.2) as described above, the strain bias in the ferroelectric plate 16 can be induced by first bonding this plate to the elastic member 11 by means of the epoxy layer 11.5 while the elastic member is under an applied compression (or tension), and then releasing the compression (or tension) from the member 11 after the epoxy has hardened, thereby putting the plate 16 under a tension (or compression) as the elastic member returns to its own unstressed equilibrium state.

In addition to the "push-pull" arrangement of the two strain-biased devices 10.1 and 10.2, (or 40.1 and 40.2), with the electrode configuration shown in FIG. 3 (or FIG. 4), it should be pointed out that such push-pull arrangement of two strain-biased devices can be used in conjunction with other types of electrode configurations, such as that shown in *Electronics*, Feb. 1, 1971, at page 39, in an article coauthored by A. H. Meitzler and the present inventor (transparent electrodes on opposed major surfaces of the strain-biased ferroelectric plates).

What is claimed is:

1. An optical retardation device which comprises:

a. a polycrystalline electrooptic plate which is in a condition of strain bias in the plane of the plate, by virtue of a stress applied to the plate, thereby defining an axis of tension (or compression) in the plate; and b. means for producing an electric field in at least a portion of the plate in a direction in the plane of the plate which is oriented at an oblique angle with respect to said axis, whereby birefringence is induced in at least said portion of the plate with respect to a beam of optical radiation propagating through this portion of the plate.

2. The device recited in claim 1 in which the plate is essentially a fine grain ferroelectric ceramic material.

3. The device recited in claim 2 in which the material is essentially lead zirconate-lead titanate doped with an impurity.

4. The device recited in claim 3 in which the material is lanthanum doped lead zirconate-lead titanate, and in which the size of the grains in the material is approximately 2 microns or less.

5. The device recited in claim 1 in which said means include a pair of electrodes geometrically arranged to produce the electric field in response to voltages applied across said electrodes.

6. An optical light gate which comprises:

a. the device recited in claim 1; and b. an optical polarizer and an optical analyzer located on opposite sides of the plate.

7. The device recited in claim 1 which further includes means for producing the strain bias in the plate.

8. An optical retardation device in accordance with claim 2 in which the oblique angle is approximately 45°.

9. An optical system which comprises:

a. first optical retardation device including a first electrooptic plate which is in a condition of strain bias in the plane of the plate, thereby defining a first axis of tension (or compression) in the plate and means for producing an electric field in at least a portion of the plate at an angle between 10° and 80° with respect to said first axis, whereby birefringence is induced in at least said portion of the first plate with respect to a beam of optical radiation propagating through this portion of the first plate; and b. a second optical retardation device including a second electrooptic plate which is in a condition of strain bias in the plane of the plate, thereby defining a second axis of tension (or compression) in the plate, the second axis oriented at an angle with respect to the first axis, and means for producing an electric field in at least a portion of the second plate in a direction which is oriented at an angle between 10° and 80° with respect to said second axis, whereby birefringence is induced in at least said portion of the second plate with respect to the beam of optical radiation propagating through this portion of the second plate after propagating through the first plate.

10. An optical system in accordance with claim 9 in which the first axis is oriented substantially at right angles with respect to the second axis.

11. An optical retardation system which comprises first and second polycrystalline electrooptic plates, the first plate being under an applied tension and the second plate being under an applied compression, the axis of tension in the first plate being parallel to the axis of compression in the second plate, and means for producing an electric field in the first plate and in the second plate, the electric field in the first plate being oriented at an angle between 10° and 80° with respect to the axis of tension, and the electric field in the second plate being oriented at an angle between 10° and 80° with respect to the axis of compression, whereby birefringence is induced in the first and second plates with respect to a beam of optical radiation propagating through the plates.

12. The system recited in claim 11 which is provided with an optically reflecting layer located and oriented in space such that the beam of optical radiation can simultaneously pass through both plates and be reflected by said reflecting layer back through both plates.

13. The device recited in claim 11 in which the first and second plates are bonded to opposite sides of a transparent elastic member, said member being under a bending moment which produces the tension and the compression in the first and second plates, respectively.

* * * * *